(12) United States Patent
Menon et al.

(10) Patent No.: US 11,695,545 B2
(45) Date of Patent: *Jul. 4, 2023

(54) SYSTEMS AND METHODS FOR CONTROLLED RANDOM ENDORSEMENT IN A BLOCKCHAIN NETWORK

(71) Applicant: Verizon Patent and Licensing Inc., Basking Ridge, NJ (US)

(72) Inventors: Pradeep Menon, Potomac, MD (US); Rahul Koneru, Ashburn, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 284 days.

This patent is subject to a terminal disclaimer.

(21) Appl. No.: 17/118,873

(22) Filed: Dec. 11, 2020

(65) Prior Publication Data

US 2021/0099280 A1    Apr. 1, 2021

Related U.S. Application Data

(63) Continuation of application No. 16/013,709, filed on Jun. 20, 2018, now Pat. No. 10,880,072.

(51) Int. Cl.
| | | |
|---|---|---|
| *H04L 9/06* | (2006.01) | |
| *H04L 9/32* | (2006.01) | |
| *G06F 21/60* | (2013.01) | |

(52) U.S. Cl.
CPC .......... *H04L 9/0637* (2013.01); *G06F 21/602* (2013.01); *H04L 9/3228* (2013.01); *H04L 9/3242* (2013.01)

(58) Field of Classification Search
CPC ... H04L 9/0637; H04L 9/3228; H04L 9/3242; H04L 2209/38; H04L 9/3239; G06F 21/602
See application file for complete search history.

(56) References Cited

U.S. PATENT DOCUMENTS

| | | | |
|---|---|---|---|
| 2011/0153724 A1 | 6/2011 | Raja et al. | |
| 2016/0119146 A1* | 4/2016 | Anderson | ............. H04L 9/0869 380/30 |

(Continued)

FOREIGN PATENT DOCUMENTS

| | | | | |
|---|---|---|---|---|
| WO | 2016/202952 | 12/2016 | | |
| WO | WO-2016202952 A1 * | 12/2016 | ........... | G06Q 20/065 |

*Primary Examiner* — Taghi T Arani
*Assistant Examiner* — Blake I Narramore (57) ABSTRACT

A multi-scheme random selection of blockchain endorsers may preserve anonymity of nodes that participate in a blockchain network, and may assign each node an endorsement load that is proportionate to the utilization of the blockchain network by that node. Selection of one or more nodes to endorse data before recordation to the blockchain may include randomly selecting an active endorser selection scheme from a set of available endorser selection schemes, and randomly selecting one or more nodes as endorsers for the data based on the active endorser selection scheme. Each scheme may be derived based on the tracked utilization over different time scales. Exit criteria may determine when to switch the active endorser selection scheme. The exit criteria may be based on a number of times each node is selected as an endorser under the active endorser selection scheme, and utilization of the blockchain network by each node.

20 Claims, 8 Drawing Sheets

(56) References Cited

U.S. PATENT DOCUMENTS

| | | | |
|---|---|---|---|
| 2016/0323741 A1* | 11/2016 | Lee | H04W 12/06 |
| 2017/0046536 A1 | 2/2017 | Maximov et al. | |
| 2017/0132621 A1 | 5/2017 | Miller et al. | |
| 2017/0232300 A1* | 8/2017 | Tran | A63B 71/06 |
| | | | 434/247 |
| 2018/0225448 A1* | 8/2018 | Russinovich | G06F 21/53 |
| 2018/0285412 A1 | 10/2018 | Zhuang | |
| 2018/0337882 A1 | 11/2018 | Li et al. | |
| 2018/0349867 A1 | 12/2018 | Trieflinger | |
| 2019/0098080 A1 | 3/2019 | Bermudez et al. | |
| 2019/0102423 A1 | 4/2019 | Little et al. | |
| 2019/0104196 A1 | 4/2019 | Li et al. | |
| 2019/0140819 A1 | 5/2019 | Dolev | |
| 2019/0156336 A1 | 5/2019 | Kasthuri | |
| 2019/0207766 A1 | 7/2019 | Sanghvi | |
| 2019/0259024 A1 | 8/2019 | Zhang et al. | |
| 2019/0278852 A1 | 9/2019 | Jayachandran et al. | |
| 2019/0340946 A1 | 11/2019 | Elmessiry et al. | |
| 2019/0354397 A1 | 11/2019 | Goel et al. | |
| 2019/0356469 A1 | 11/2019 | Deshpande et al. | |
| 2019/0356487 A1* | 11/2019 | Lu | H04L 9/16 |
| 2019/0372772 A1 | 12/2019 | Novotny et al. | |
| 2019/0379754 A1* | 12/2019 | Krishnaswamy | H04L 67/289 |
| 2019/0384627 A1* | 12/2019 | De Caro | G06Q 20/223 |
| 2020/0034353 A1 | 1/2020 | Innocenti | |
| 2020/0034928 A1* | 1/2020 | Lim | G06Q 40/04 |

\* cited by examiner

| Node ID | Scheme | Load | Load % |
| --- | --- | --- | --- |
| 120-1 | Monthly | 20 | 9.8 |
| 120-2 | Monthly | 60 | 29.42 |
| 120-3 | Monthly | 4 | 1.96 |
| 120-4 | Monthly | 120 | 58.82 |

520

| Node ID | Scheme | Load | Load % |
| --- | --- | --- | --- |
| 120-1 | Weekly | 8 | 13.33 |
| 120-2 | Weekly | 20 | 33.33 |
| 120-3 | Weekly | 2 | 3.33 |
| 120-4 | Weekly | 30 | 50.00 |

SYSTEMS AND METHODS FOR CONTROLLED RANDOM ENDORSEMENT IN A BLOCKCHAIN NETWORK

CROSS-REFERENCE TO RELATED APPLICATION

This application is a Continuation of U.S. patent application Ser. No. 16/013,709, filed on Jun. 20, 2018, titled "SYSTEMS AND METHODS FOR CONTROLLED RANDOM ENDORSEMENT IN A BLOCKCHAIN NETWORK," the contents of which are herein incorporated by reference in their entirety.

BACKGROUND

Blockchain may be an effective technology for securing and verifying data. A blockchain network may include a set of decentralized and/or distributed nodes. Each node may participate in the blockchain network by submitting data for secure recordation to a blockchain ledger, and/or by endorsing data submitted by another node to validate the data before recordation to the blockchain ledger. Utilization and anonymity of the nodes may vary across different blockchain networks based on how the endorsement load is assigned to the participating nodes in each blockchain network.

DETAILED DESCRIPTION OF PREFERRED EMBODIMENTS

The following detailed description refers to the accompanying drawings. The same reference numbers in different drawings may identify the same or similar elements.

Systems and/or methods, as described herein, provide a blockchain network for preserving anonymity of nodes that participate in the blockchain network and that are selected to endorse data at different times, while also assigning each node an endorsement load that is proportionate to the utilization of the blockchain network by that node. In some embodiments, the blockchain network may use a multi-scheme random selection of blockchain endorsers to preserve endorsing node anonymity and to proportionately assign endorsement load to the nodes based on their utilization of the blockchain network.

According to the multi-scheme random selection of blockchain endorsers, an endorser selection scheme from a set of available endorser selection schemes may be randomly selected as an active scheme. The active scheme may specify a first set of policies for randomly selecting nodes to endorse data for recordation to the blockchain. Exit criteria may be associated with the active scheme, and may determine when anonymity or randomness of an endorser selected by the active endorser selection scheme is degraded. When the exit criteria is met, the multi-scheme random selection of blockchain endorsers may switch the active scheme by randomly selecting a different endorser selection scheme from the set of available endorser selection scheme as the active scheme. The multi-scheme random selection may then continue by randomly selecting one or more nodes as endorsers based on a different second of policies of the endorser selection scheme that is active when requests for recording data to the blockchain are received.

The multi-scheme random selection of blockchain endorsers may preserve endorsing node anonymity by preventing or significantly decreasing the likelihood that an attacker can identify any particular node of the blockchain network (e.g., as an endorser for endorsing a particular transaction in order to alter the data of that particular transaction before the particular transaction is committed to the blockchain). The multi-scheme random selection of blockchain endorsers may also prevent two or more nodes from partnering and/or sharing resources in a manner that may comprise the recordation and/or the data that is recorded to the blockchain. By also assigning endorsement loads that are proportionate to the utilization of the blockchain network by each node, the multi-scheme random selection may control the number of endorsements that are performed by a node, and may provide fair access to the blockchain network in contrast to blockchain networks where nodes are selected as endorsers based on voting, proof-of-work, proof-of-elapsed time, proof-of-stake, or other selection schemes.

Figure 1:
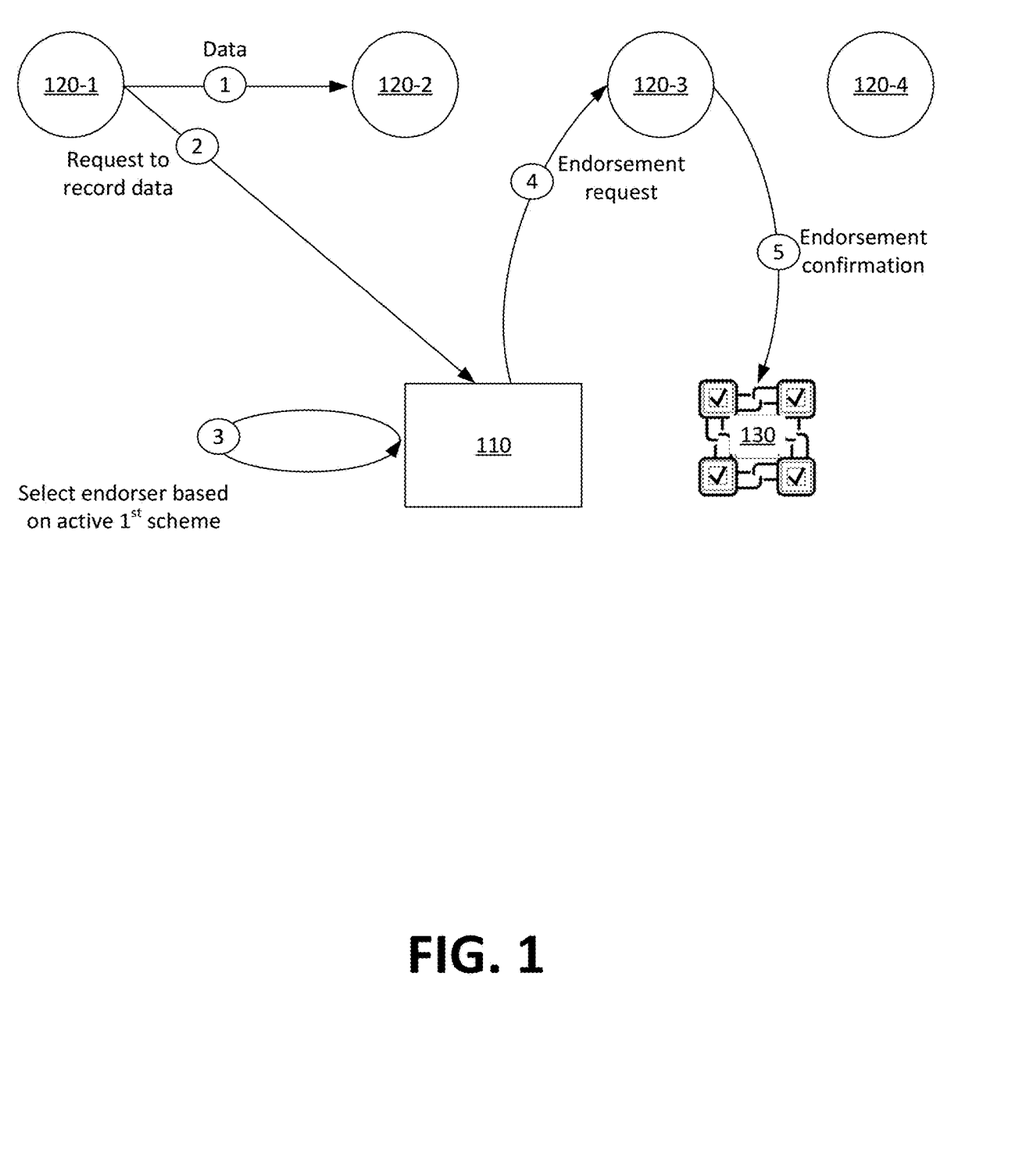
FIGS. 1 and 2 conceptually illustrate a multi-scheme random selection of blockchain endorsers in accordance with some embodiments.
Figure 2:
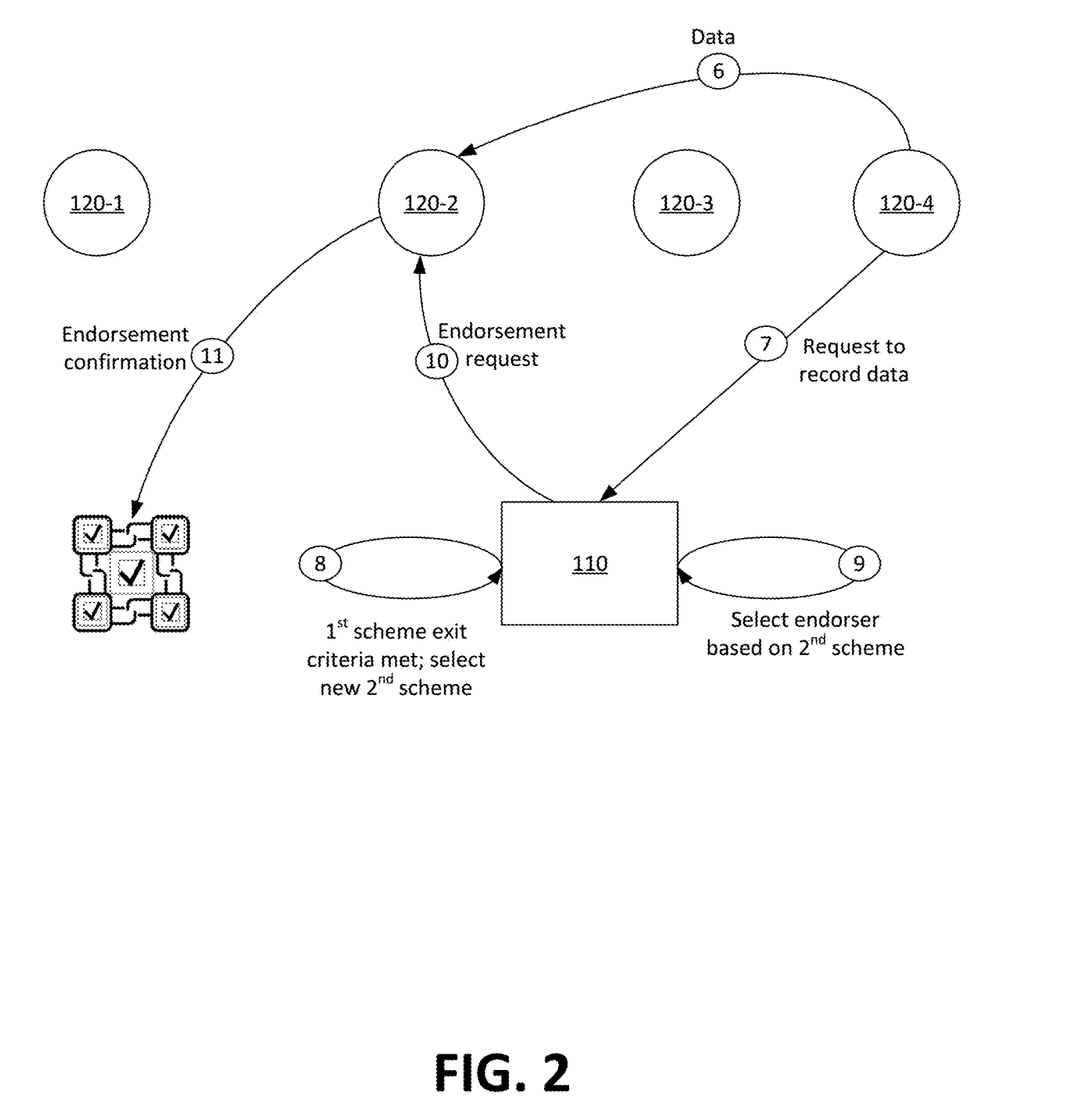

FIGS. 1 and 2 conceptually illustrate the multi-scheme random selection of blockchain endorsers in accordance with some embodiments. The figures illustrate an example blockchain network that includes selector 110, different network nodes 120-1 through 120-4 (herein sometimes collectively referred to as "nodes 120" or individually as "node 120"), and blockchain 130. In some embodiments, selector 110 may be implemented as a device operating separate from each node 120. In some other embodiments, selector 110 may be a distributed device that operates on each node 120. Similarly, blockchain 130 may be a distributed ledger in which each node 120 and/or selector 110 stores a local copy or ledger of blockchain 130.

Each network node 120 may represent a different device or system that participates in the blockchain network. Participation in the blockchain network may include submitting data for recordation to blockchain 130. The data can be any message, transaction, or other type of data that is exchanged, stored, or created by one or more nodes 120. Participating in the blockchain network may also include endorsing the data of other nodes before the data is recorded to blockchain 130. An endorsement, by one or more nodes 120, may validate and/or lock the state of data before the data is recorded to blockchain 130 in the form of a hash value.

As shown in FIG. 1, network node 120-1 may provide (at 1) first data to network node 120-2. For instance, network node 120-1 may provide a message, business system files, communication logs, activity logs, executed events, and/or other data to network node 120-2. In order for the data to be recorded, network node 120-1 may provide (at 2, which may occur simultaneously with or relatively soon after providing the data at arrow 1) to selector 110, a request for recordation of the first data to blockchain 130. Network node 120-1 may provide (at 2) the request when the first data is the subject of an audit, is related to a secure transaction, or includes any transaction that may later need to be verified as having been changed or unchanged. For security reasons, the request may include a hash value representing the first data. The hash value may be the result of network node 120-1 hashing the first data with a cryptographic hashing function. The request may further include metadata associated with the first data.

Selector 110 may determine that a first endorser selection scheme is active for determining which one or more nodes 120 should be selected to endorse the first data. The first endorser selection scheme may include a first set of policies that may be derived from a load distribution configuration. The load distribution configuration may track usage of the blockchain network by each node 120. The usage may be quantified according to the number of data recordation requests originating from each network node 120 over one or more time intervals, and/or the number of endorsements performed by each network node 120 while the first endorser selection scheme is active. Additionally, or alternatively, usage may be quantified with other measurable metrics associated with each node 120. For example, usage may be quantified based on data frequency, data importance, node cost or payment, node audit rate, and/or resource utilization (e.g., processor, memory, and/or bandwidth utilization for purposes related to blockchain 130) of each node 120. In FIG. 1, selector 110 may select (at 3) network node 120-3 to endorse the first data according to the first set of policies of the first endorser selection scheme. For instance, the first endorser selection scheme may determine a utilization distribution according to utilization of blockchain 130 by each node 120 over a specific time interval (e.g., hour, day, week, month, or other measure of time), and may randomly select node 120-3 as the next endorser based on the utilization distribution and previous selections of nodes 120 as endorsers while the first endorser selection scheme is active.

Selector 110 may provide (at 4) an endorsement request to network node 120-3 in response to selecting (at 3) network node 120-3 as an endorser for the first data. The endorsement request may include a top hash value and a hash tree. The top hash value may be derived in part from the hash tree. The hash tree may include several branches and at least one leaf corresponding to the hash value from the data recordation request provided (at 2) by network node 120-1.

Network node 120-3 may provide (at 5) an endorsement confirmation in response to matching the top hash from the endorsement request with a recomputed top hash value. As will be explained in further detail below, network node 120-3 may generate the recomputed top hash value based on a root hash of the hash tree from the endorsement request and a previous hash value from a local ledger or local copy of blockchain 130 stored by network node 120-3, wherein network node 120-3 computes the root hash by hashing the hash values of at least one pair of leaves from a common branch of the hash tree.

In response to the endorsement confirmation, a block recording the first data may be committed to blockchain 130. In some embodiments, the block may be broadcast to each node 120 for inclusion in the local ledger or local copy of blockchain 130 stored by each network node 120.

In FIG. 2, network node 120-4 may provide (at 6) second data to network node 120-2, and may provide (at 7) selector 110 with a request to record the second data to blockchain 130. Selector 110 may determine (at 8) that exit criteria associated with the active first endorser selection scheme has been met (e.g., criteria indicating that another scheme should be selected), thereby causing selector 110 to randomly select a different second endorser selection scheme from an available set of endorser selection schemes, in accordance with some embodiments. The second endorser selection scheme may include a different second set of policies that may also be derived from the load distribution configuration. The first set of policies associated with the first endorser selection scheme and the second set of policies associated with the second endorser selection scheme may produce different random selections of nodes 120 as endorsers. For instance, the random selections may be based on different utilization distributions that are derived from utilization of blockchain 130 by nodes 120 over different time intervals. Consequently, changing between the different endorser selection schemes may help to preserve the anonymity of the next endorser by periodically changing the policies with which selector 110 selects a next endorser. As shown in FIG. 2, selector 110 may select (at 9) network node 120-2 to endorse the second data based on the second endorser selection scheme.

Selector 110 may provide (at 10) an endorsement request for the second data to network node 120-2. In this case, the endorsement request may include a top hash value derived in part from a hash tree with at least one leaf corresponding to the hash value of the second data.

Network node 120-2 may endorse the second data, and may provide (at 11) an endorsement confirmation. In response to the endorsement confirmation, a block recording the second data may be committed to blockchain 130, and/or the block may be broadcast to each node 120 for inclusion in the local ledger or local copy of blockchain 130 stored by each node 120.

The figures above illustrate selector 110 selecting a single node for a single endorsement of data before the data is recorded to blockchain 130. In some embodiments, selector 110 may randomly select two or more endorsers for multiple endorsements of data before the data is recorded to blockchain 130. The redundant endorsement may improve blockchain security by ensuring proper and valid recordation of data even if one node selected as an endorser is compromised.

Figure 3:
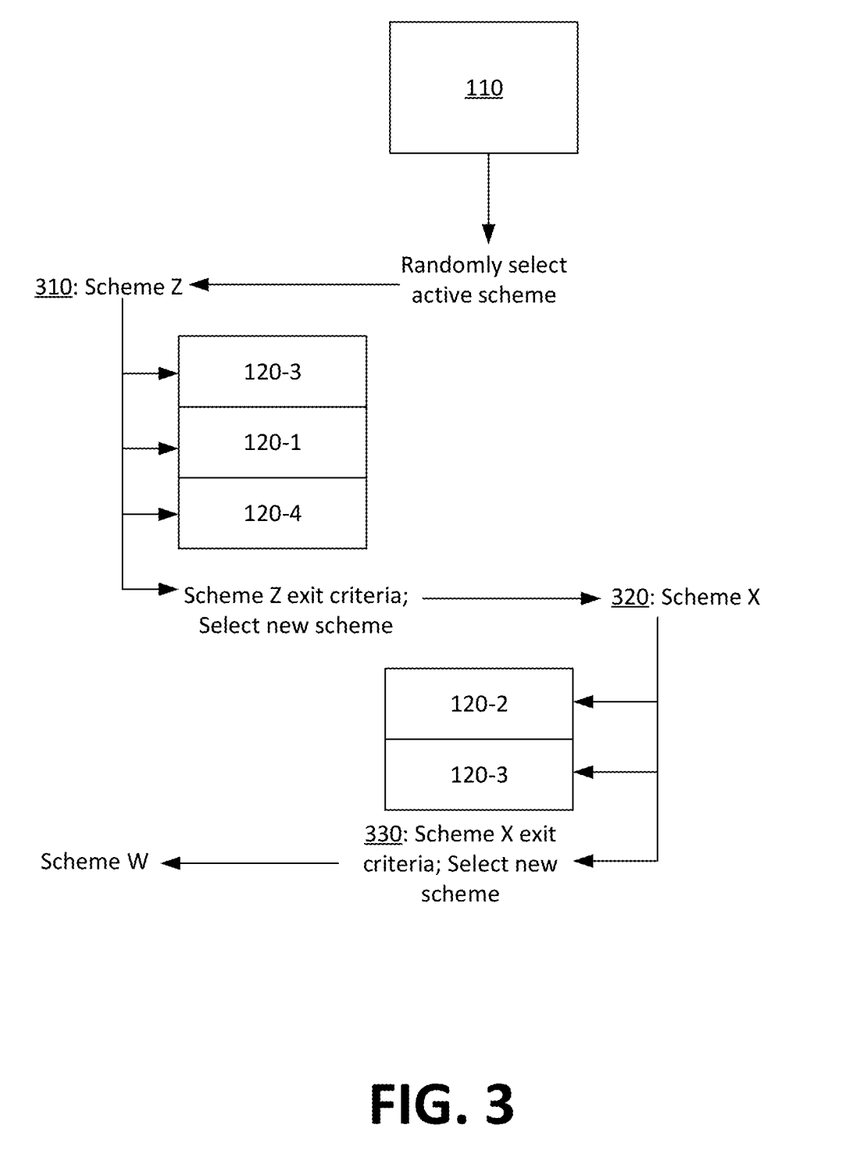
FIG. 3 provides an example of a selector selecting different nodes as endorsers based on different endorser selection schemes.

FIG. 3 provides an example of selector 110 selecting different nodes as endorsers based on different schemes. As shown, selector 110 may randomly select first endorser selection scheme 310 (shown as example "Scheme Z") as a current active scheme. Selector 110 may then randomly select a first set of endorsers from amongst nodes 120 for three subsequently received data recordation requests using first endorser selection scheme 310. First endorser selection scheme 310 may randomize the selection of nodes 120 as endorsers based on a first set of policies that may be derived from the load distribution configuration tracking node utilization of the blockchain network.

After the selection of endorsers (e.g., nodes 120-3, 120-1, and 120-4) for the three data recordation requests based on the first endorser selection scheme, exit criteria of the first endorser selection scheme may be met. For instance, the selection of nodes 120-3, 120-1, and 120-4 as endorsers may increase the likelihood that one or more nodes 120 may be selected as a next endorser. The increased likelihood of being selected as a next endorser may result from biasing the first endorser selection scheme or otherwise ensuring that the first endorser selection scheme does not assign a disproportionate amount of the endorsement load to any node 120. The increased likelihood of the one or more nodes 120 being selected may exceed a threshold or preset value that is indicative of degraded node anonymity. Therefore, to preserve node anonymity, selector 110 may remove first endorser selection scheme 310 as the current active scheme, and may randomly select second endorser selection scheme 320 (shown as "Scheme X") as the new active scheme.

Second endorser selection scheme 320 may randomize the selection of nodes 120 as endorsers based on a different second set of policies that may be derived from the load distribution configuration tracking node utilization of the blockchain network. For instance, selector 110 may use second endorser selection scheme 320 to randomly select a second set of endorsers from amongst nodes 120 for two subsequently received data recordation requests based on a different utilization distribution than was used for the random selection via first endorser selection scheme 310.

Second endorser selection scheme 320 may be associated with different exit criteria than first endorser selection scheme 310. Accordingly, selector 110 may exit second endorser selection scheme 320 after selecting a different number of endorsers with second endorser selection scheme 320 than with first endorser selection scheme 310. After exit criteria of second endorser selection scheme 320 is met, selector 110 may randomly select third endorser selection scheme 330 (shown as "Scheme W") from an available set of endorser selection schemes to modify the random endorser selection, and preserve endorser anonymity.

Figure 4:
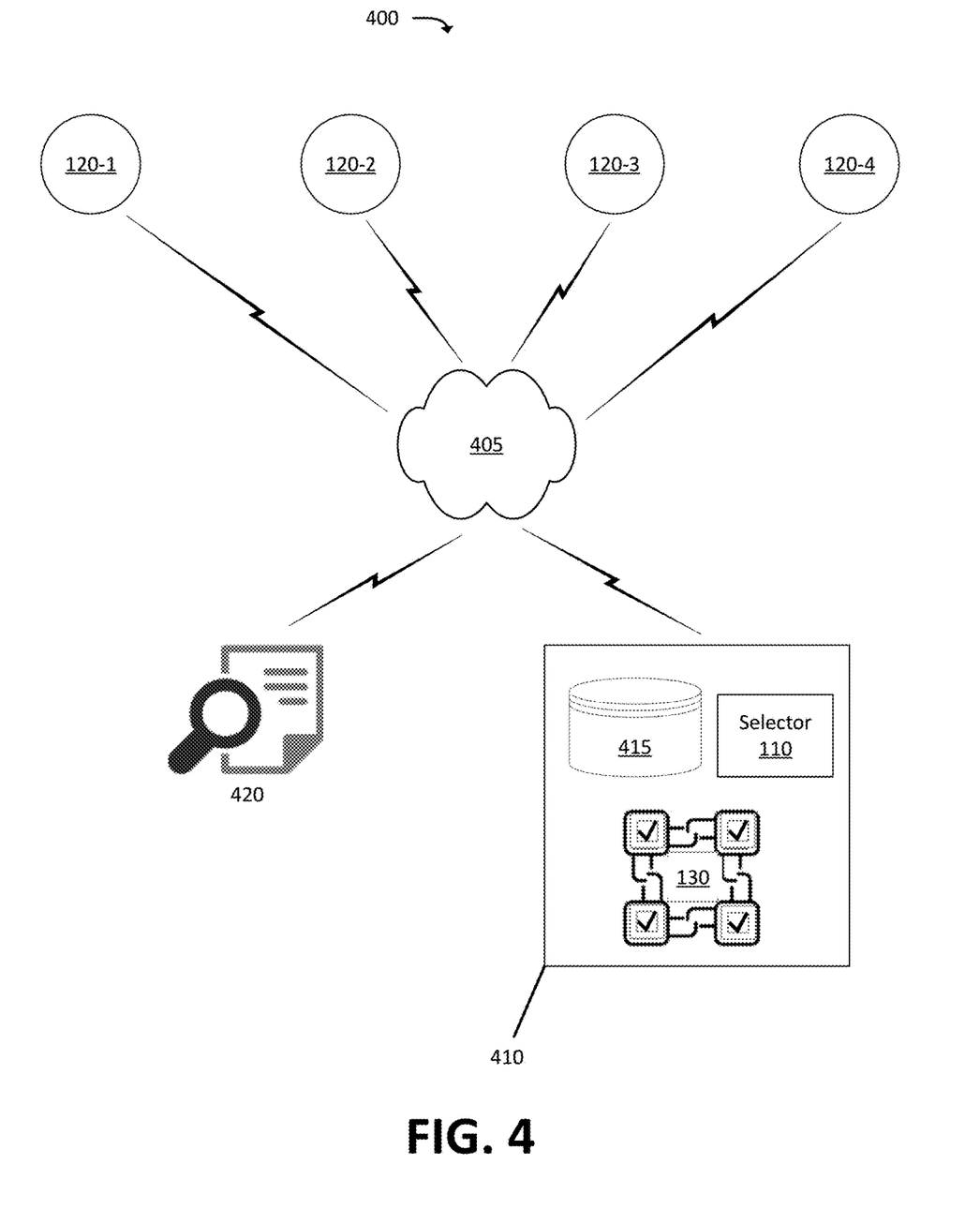
FIG. 4 illustrates an example environment, in which one or more embodiments, described herein, may be implemented.

FIG. 4 illustrates an example environment 400, in which one or more embodiments, described herein, may be implemented. As shown in FIG. 4, environment 400 may include network 405, data provenance system 410, nodes 120, and auditor 420. The quantity of devices and/or networks, illustrated in FIG. 4, is provided for explanatory purposes only. In practice, environment 400 may include additional systems, devices, and/or networks; fewer systems, devices, and/or networks; different systems, devices and/or networks; or differently arranged systems, devices, and/or networks than illustrated in FIG. 4. For example, while not shown, environment 400 may include devices that facilitate or enable communication between various components shown in environment 400, such as routers, network switches, gateways, etc. Alternatively, or additionally, one or more of the systems and/or devices of environment 400 may perform one or more functions described as being performed by another one or more of the devices of environments 400. For instance, various functionality described below as being part of data provenance system 410 may be distributed and implemented across nodes 120. Systems and devices of environment 400 may interconnect with each other and/or other systems or devices via wired connections, wireless connections, or a combination of wired and wireless connections. In some implementations, one or more systems and/or devices of environment 400 may be physically integrated in, and/or may be physically attached to, one or more other devices of environment 400.

Network 405 may include one or more of a Local Area Network ("LAN"), a wireless telecommunications network, an IP-based Packet Data Network ("PDN"), a Wide Area Network ("WAN") such as the Internet, a private enterprise network, and/or one or more other networks. For example, nodes 120 may operate in one or more LANs, and one or more WANs may connect the LANs and allow nodes 120 to communicate with one another despite being on different LANs. In some implementations, network 405 may be, or include, a cellular network, such as a Third Generation ("3G") network, a Fourth Generation ("4G") network, a Long-Term Evolution ("LTE") network, a Fifth Generation ("5G") network, a Code Division Multiple Access ("CDMA") network, etc. Network 405 may include, and/or may be connected to, one or more other networks, such as a public switched telephone network ("PSTN"), a Public Land Mobile Network ("PLMN"), and/or another network.

Nodes 120 include different systems and devices that participate in the blockchain network. For instance, nodes 120 may include any computation and communication device that is capable of communicating with one or more networks (e.g., network 405). For example, a node 120 may include a device that can access voice or calling services provided by network 405, and/or receive data, content, such as web pages (e.g., that include text content and/or image content), streaming audio and/or video content, and/or other content, via an Internet connection, data services provided by network 405, and/or via some other delivery technique. In some implementations, a node 120 may be or may include a radiotelephone, a personal communications system ("PCS") terminal (e.g., a device that combines a cellular radiotelephone with data processing and data communications capabilities), a personal digital assistant ("PDA") (e.g., a device that includes a radiotelephone, a pager, etc.), a smart phone, a laptop computer, a tablet computer, a vehicle (e.g., automobile), a telematics equipped device or terminal, a television, a personal gaming system, a wearable device, and/or another type of computation and communication device. As noted above, nodes 120 may participate in the blockchain network by submitting or endorsing requests for data recordation to blockchain 130. Nodes 120 may have one or more network interfaces to one another and/or data provenance system 110.

Data provenance system 410 may include datastore 415, selector 110, and blockchain 130. One or more of datastore 415 or selector 110 may be implemented in a centralized manner on one or more computing devices that are separate and distinct from the computing devices of nodes 120. In some centralized embodiments, nodes 120 may be configured with addressing (e.g., Internet Protocol ("IP") address, Uniform Resource Locator ("URL"), or other network identifier) of selector 110, and may be configured to provide data recordation requests to selector 110 using the configured addressing. For instance, when a node joins the blockchain network, it may receive addressing of selector 110, and/or one or more locally executed modules that facilitate the node's participation in the blockchain network. The modules may provide the interfaces, communication protocols, messaging formats, and/or other mechanisms for providing data recordation requests to selector 110, and/or for receiving, executing, and/or responding to endorsement requests. One or more of datastore 415 or selector 110 may also be implemented in a distributed manner such that the corresponding functionalities execute on the same computing devices as nodes 120. For instance, each node 120 may be configured with a local instance of selector 110. The local instance of selector 110 may select endorsers for a data recordation request, generated by that node, using the multi-scheme random selection provided herein.

Datastore 415 may generate and store load distribution configuration information for nodes 120 participating in the blockchain network. In some embodiments, each node 120 may provide an expected usage upon joining the blockchain network. The expected usage provided by a particular node may be used to include the particular node in the blockchain utilization distribution, and allow the particular node to participate in the blockchain network (e.g., be selected as an endorser or provide data for recordation to blockchain 130) when there is no prior actual usage from which to determine the particular node's utilization of the blockchain network. The expected usage may be based on an expected frequency with which a node 120 may produce data for recordation to blockchain 130. The expected usage can be quantified based on an expected number of data that are to be recorded to blockchain 130 on a monthly, weekly, daily, hourly, or other basis if known. For instance, node 120-1 may expect to produce 20 data instances every month, but at irregular times during a week, for recordation to blockchain 130, and node 120-2 may expect to produce 60 data instances every month at 2 data instances per day for recordation to blockchain 130.

Datastore 415 may update the load distribution configuration to replace the expected usage with actual usage, to update prior actual usage statistics, or to append to prior actual usage statistics. Datastore 415 may update the load distribution configuration by monitoring each node's actual utilization of the blockchain network once a node begins to participate in the blockchain network. Datastore 415 may monitor each node's actual utilization based on a count of data recordation requests submitted by each node 120 to selector 110. Datastore 415 may also store a timestamp with each such request in order to determine daily, weekly, monthly, or other time-based usage of the blockchain network. Measuring the blockchain network utilization based on the number of recordable data instances originating from each node 120 may provide an objective and node-independent measure of the utilization. Thus, hardware differences, such as processor speed, available memory, or bandwidth, may not be directly reflected by the measure of utilization.

Datastore 415 may also store metadata for blockchain 130. In particular, the metadata may provide identifying information about each data validated by a block of blockchain 130, and/or identifying information about the block itself. For instance, the metadata may specify a last modified timestamp for a recorded data instance, an identifier of the originating node 120 for the data, an identifier associated with a specific system or device to which the data relates, the number of endorsements for the data, the resulting hash value, a block index for the block validating the data, and/or other identifying information about the data or block.

Datastore 415 may also serve as a buffer for buffering and/or queuing data recordation requests until the data has been endorsed and committed to blockchain 130. In some embodiments, datastore 415 may temporarily queue a request for data recordation when the endorsement of that data occurs with a delay relative to receiving the corresponding request. In some embodiments, datastore 415 may temporarily queue two or more data recordation requests to form an endorsement request for endorsing multiple data instances at once. For instance, the endorsement request may include a hash tree (e.g., a Merkle tree). The leaves of the hash tree may correspond to hash values of different individual data instances. The non-leaf nodes of the hash tree may correspond to the hash values of their children nodes. By computing the root hash of the hash tree, an endorser can verify each of the individual data instances included as leaves of the hash tree. The root hash may be used in conjunction with a previous hash to form a new block of blockchain 130 that endorses each of the individual data instances.

Figure 5:
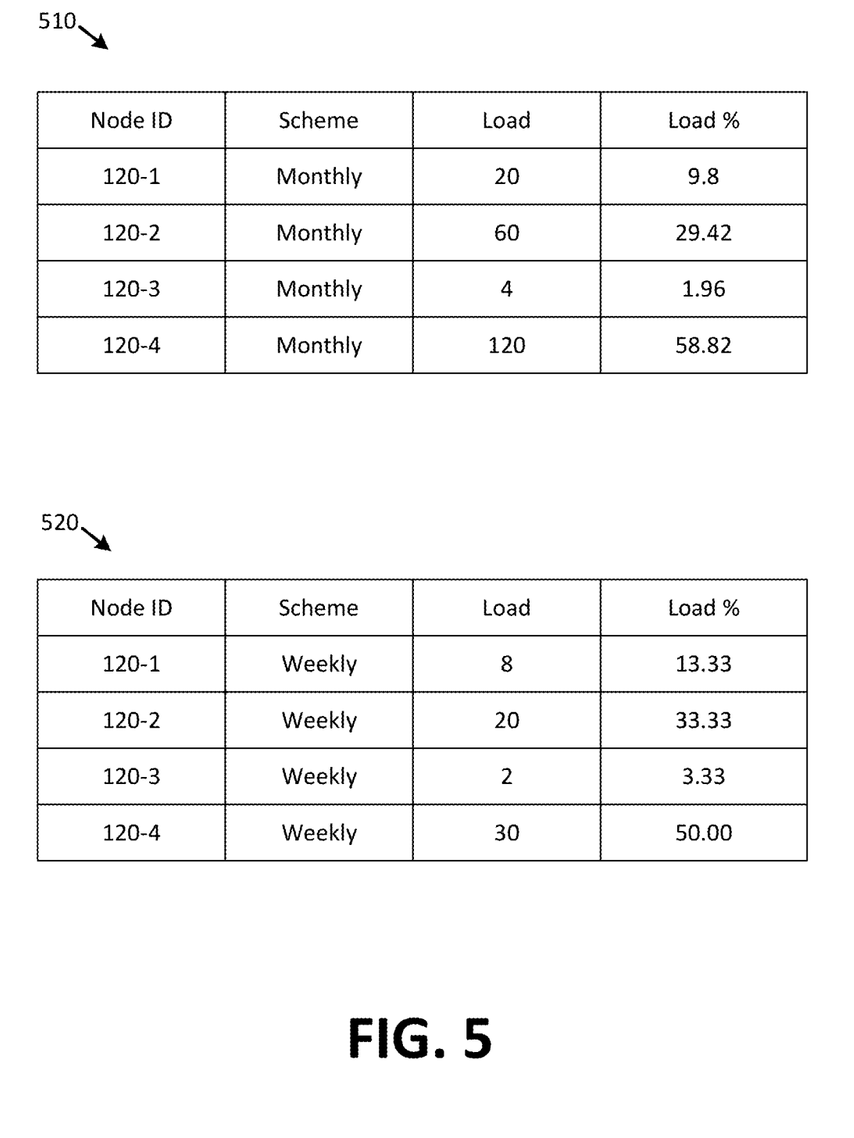
FIG. 5 illustrates examples of two different endorser selection schemes that may be derived from a load distribution configuration.

Selector 110 may perform the multi-scheme random selection of blockchain endorsers as illustrated above with reference to FIGS. 1-3. In particular, selector 110 may randomly change between different active endorser selection schemes, and may randomly select one or more nodes 120 to endorse data based on an active endorser selection scheme. Each endorser selection scheme may produce a different proportionate distribution of the endorsement load to nodes 120 based on the utilization of the blockchain network by each node 120. To determine the proportionate distribution, each scheme of the set of endorser selection schemes used by selector 110 may be derived from the load distribution configuration that tracks node 120 utilization of the blockchain network. FIG. 5 illustrates examples of two different endorser selection schemes 510 and 520 that may be derived from a load distribution configuration.

Endorser selection scheme 510 may be derived based on monthly distribution of node utilization tracked by the load distribution configuration. For instance, endorser selection scheme 510 illustrates node 120-1 accounting for 9.8% of the total blockchain utilization in the past month (e.g., a usage count in the past month) or on a monthly basis (e.g., a rolling average, mean, minimum, maximum, median, or other measure that accounts for usage in the past month and prior to the past month). As shown in FIG. 5, node 120-1 may have provided 20 data recordation requests in the past month, and all nodes 120 may have provided 204 (e.g., 20+60+4+120) data recordation requests in the past month. Accordingly, node 120-1 may account for 9.8% of total blockchain utilization in the past month, and may have a 9.8% chance of being selected to endorse data when endorser selection scheme 510 is active, and when selector 110 selects nodes as endorsers using endorser selection scheme 510. In some embodiments, node 120-1 may only be selected as an endorser for data that does not originate from node 120-1.

Endorser selection scheme 520 may be derived based on a weekly distribution of node utilization tracked by the load distribution configuration. For instance, endorser selection scheme 520 illustrates node 120-1 accounting for 13.33% of the blockchain utilization in the past week (e.g., 8 of 60 total data recordation requests). Accordingly, node 120-1 may have a 13.33% chance of being selected to endorse data when endorser selection scheme 520 is active, and when selector 110 selects nodes as endorsers using endorser selection scheme 520.

Selector 110 may determine the distributions for endorser selection scheme 510 and 520 periodically. For example, selector 110 may determine the distributions once every day based on updated values from the load distribution configuration. As another example, selector 110 may determine the distribution for endorser selection scheme 510 at the start of every month, and may determine the distribution for endorser selection scheme 520 at the start of every week. In some embodiments, selector 110 may determine the distributions for each endorser selection scheme (e.g., 510 and/or 520) on a random or intermittent basis (e.g., bi-monthly or on a random intermittent basis). For instance, selector 110 may determine a first distribution for endorser selection scheme 510 after one week, and may determine an updated second distribution for endorser selection scheme 510 after one month.

FIG. 5 provides two examples of different endorser selection schemes that can be derived from the load distribution configuration. Other endorser selection schemes may be derived based on node utilization loads over different time intervals (e.g., hourly, daily, and/or on a random or intermittent basis). The likelihood of a node being selected as an endorser can vary significantly based on the frequency with which the node utilizes the blockchain network. For instance, if a particular node provides all data for recordation to blockchain 130 (e.g., all of the particular node's utilization of the blockchain network) at the last day of the month, the particular node will have a very high likelihood of being selected as an endorser the following day if selector 110 selects endorsers based on an endorser selection scheme that is derived from the last day's utilization in the load distribution configuration. The likelihood of other nodes 120 being selected as endorsers will likely be lowered as a result. The same particular node will have a very low likelihood of being selected as an endorser the following week if selector 110 selects endorsers based on the endorser selection scheme that is derived from the last day's utilization, but a higher likelihood of being selected as an endorser the following week if selector 110 selects endorsers based on an endorser selection scheme that is derived from the last week's utilization. The time intervals for the different endorser selection schemes used by selector 110 may be configurable or random. The policies for the different endorser selection schemes may also be configurable such that the endorsement load distribution is based on one or more other factors in addition to or instead of a number of originated data. For instance, the endorser selection schemes may specify different functions that output different random selections of nodes 120 as endorsers based on input from the load distribution configuration.

Each endorser selection scheme may be associated with the same or different exit criteria. The exit criteria may determine when a scheme's randomness has been degraded, such that the anonymity of the next endorser selected by the scheme may be compromised or predicted with some amount of certainty. Assume that the first two endorsers selected using endorser selection scheme 510 are node 120-1 and node 120-3. Node 120-1 has a 9.8% of initially being selected as an endorser when endorser selection scheme 510 becomes active, and node 120-3 has a 1.96% of initially being selected as an endorser when endorser selection scheme 110 becomes active. Therefore, if nodes 120-1 and 120-3 are selected as endorsers, selector 110 may account for these prior selections to ensure that nodes 120-1 and 120-3 do not receive a disproportionate endorsement load in the future. In some embodiments, selector 110 may bias the distribution for subsequent endorser selections. The biasing may increase the likelihood that the next selected endorser will either be node 120-2 (e.g., with a 29.42% chance of initially being selected) or node 120-4 (e.g., with a 58.82% chance of initially being selected). In some embodiments, selector 110 may reject subsequent selections of node 120-1 or 120-3 and make another random selection until a different node is selected, because additional selections of nodes 120-1 and 120-3 may assign disproportionate load to nodes 120-1 and 120-3. In either case, anonymity of the next endorser selected by endorser selection scheme 110 may be degraded or may become predictable by some amount of certainty, such that the exit criteria for scheme 110 may cause selector 110 to remove endorser selection scheme 110 as the active scheme, and randomly select a different endorser selection scheme from the set of available endorser selection schemes as the active scheme. Exit criteria may be defined according to how many nodes 120 have yet to be selected as an endorser under an active scheme, a threshold percentage (e.g., greater than 50%) that any one node 120 may be selected as an endorser, one or more nodes being selected as endorsers a threshold number of times under an active scheme, etc.

Accordingly, in some embodiments, the exit criteria may be conditioned on the number of times each node 120 is selected as an endorser under a current active endorser selection scheme. In some such embodiments, datastore 415 may be used to temporarily store the number of times each node 120 is selected as an endorser under a current active endorser selection scheme. Selector 110 may then determine based on exit criteria of a currently active endorser selection scheme, and the past selection of nodes as endorsers under the active scheme whether a switch to a different endorser selection scheme is needed to preserve endorser anonymity. Once the exit criteria is met and a new endorser selection scheme is randomly selected, datastore 415 may reset the counts for the number of times each node 120 is selected as an endorser under a current active endorser selection scheme Blockchain 130 may provide a tamper-proof historical accounting or validation of data recorded by the blockchain network. Blockchain 130 may be formed by a series of blocks. Each block may correspond to a hash value that is derived from a hash value of a previous block and a hash value produced from hashing one or more data instances that are verified by the current block. In some embodiments, the hash value of a previous block may be the top hash of the previous block. In some embodiments, the hash value produced from hashing one or more data instances may be a root hash of the hash tree with leaves corresponding to the hash values of each of the one or more data instances.

Returning to FIG. 4, auditor 420 may be an internal or external device or collection of devices that validate past transactions or data via blockchain 130. For example, auditor 420 may confirm that data associated with a particular data recordation has not changed by hashing the data of the particular data recordation, and by querying blockchain 430 to determine if a block with a corresponding hash value exists. If so, the particular data recordation is verified to be accurate and unchanged. Auditor 420 may also use the metadata from datastore 415 to expedite querying of blockchain 130 and/or to supplement the query results with other identifying information about the data or blocks. For instance, auditor 420 may identify dates associated with data of interest. Datastore 415 may return the block index for each block of blockchain 130 that validates data within the identified dates. Auditor may then query blockchain 130 for the specific block indices to identify the data of interest, rather than query all of blockchain 130.

Figure 6:
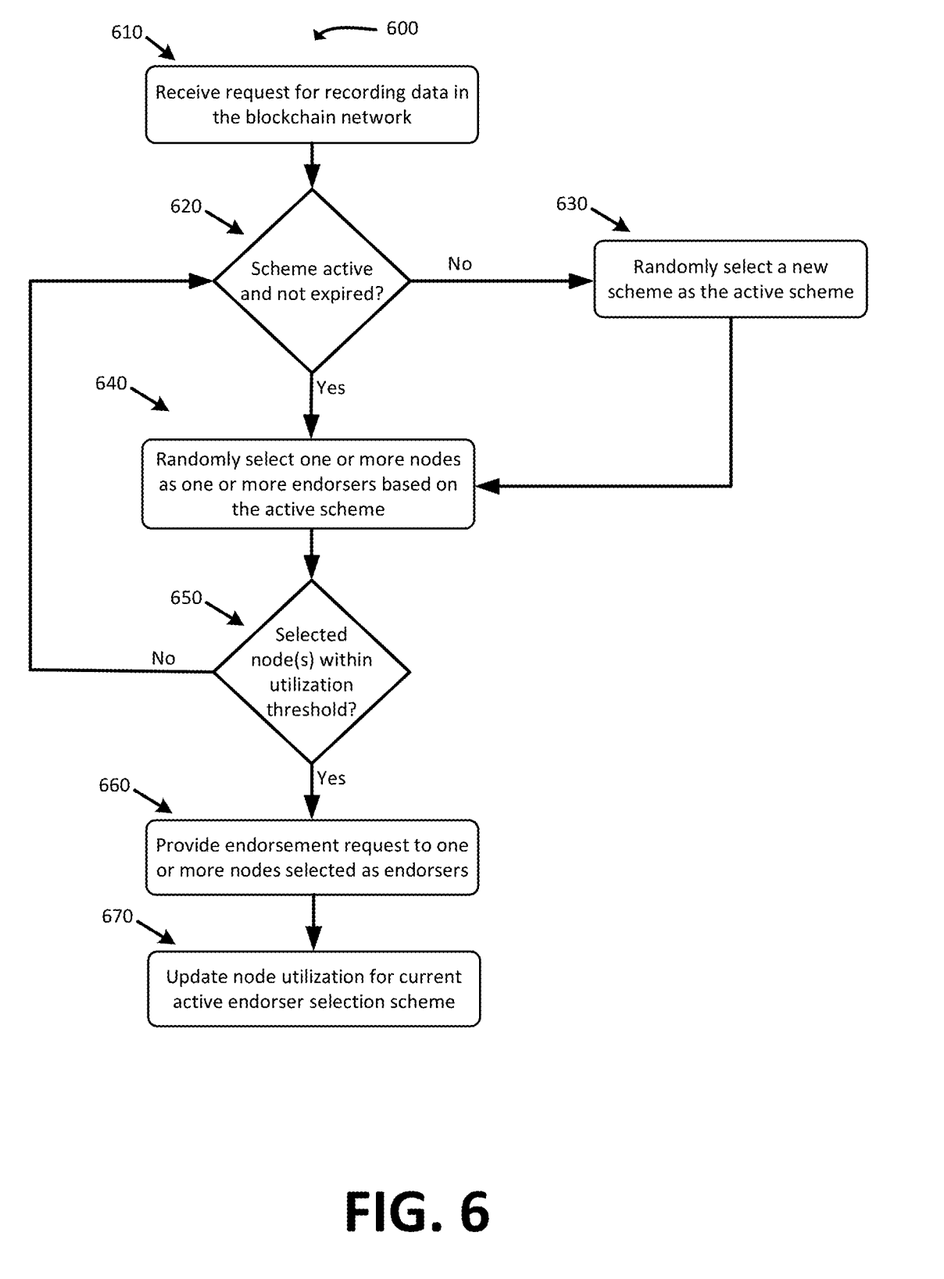
FIG. 6 presents an example process for the multi-scheme random selection of blockchain endorsers.

FIG. 6 presents an example process 600 for the multi-scheme random selection of blockchain endorsers. Process 600 may be performed by data provenance system 410. Specifically, process 600 may be performed by selector 110 accessing datastore 415 of data provenance system 410. Selector 110 and datastore 415 may execute in a centralized system implementation of data provenance system 410, or on one or more nodes 120 when data provenance system 410 is implemented as a distributed system.

Process 600 may include selector 110 receiving (at 610) a request for recording data in the blockchain network. Selector 110 may receive the request from any node 120 that participates in the blockchain network. The request may include a hash value that results from a hash of the data. The request originating node (e.g., node 120-1, 120-2, 120-3, or 120-4) may use one or more cryptographic hashes to generate the hash value included with the request. Secure Hash Algorithm (SHA), Message Digest (MD), Keccak, and variations thereof (e.g., SHA-256, SHA-2, MD5, etc.) are examples of different cryptographic hashes that may be used to hash the data, and to produce output of a fixed length (e.g., 256 bits) regardless of the length or size of the hash input. The request may further include metadata associated with the request originating node 120 and/or the data. For instance, the metadata may provide a timestamp for when the data was last modified, and an identifier of the specific device or system that originated the data.

Process 600 may include determining (at 620) if selector 110 has an active endorser selection scheme that has not expired. An endorser selection scheme is active when the exit criteria for an endorser selection scheme, currently in use by selector 110 to select a last endorser, has not been met, such that the endorser selection scheme can still be used to select a next endorser.

In response to determining (at 620—Yes) that selector 110 has an active endorser selection scheme whose exit criteria has not been met, process 600 may include randomly selecting (at 640) one or more of nodes 120 participating in the blockchain network (e.g., nodes 120) as one or more endorsers for the data based on the selected active endorser selection scheme. In some embodiments, data provenance system 410 may delay the selection of nodes as endorsers for specific data until one or more pairs of data are queued for endorsement. In doing so, the one or more pairs can be used to populate the leaves of a hash tree, and the hash tree can be sent along with a single endorsement request, such that the one or more pairs of data can be endorsed together via an endorser computing the root hash for the hash tree.

In response to determining (at 620—No) that selector 110 has no active endorser selection scheme, or the exit criteria for the current active selection scheme at selector 110 has been met, process 600 may include randomly selecting (at 630) a new endorser selection scheme from a set of available endorser selection schemes as an active scheme of selector 110. The random selection of the new endorser selection scheme can be based on a random number generator selecting a number that corresponds to one of the schemes from the set of available endorser selection schemes. The random selection can also be based on other random distributions or randomized selection techniques. Process 600 may then randomly select (at 640) one or more of nodes 120 as endorsers for the data or a set of queued data based on the selected active endorser selection scheme.

Process 600 may determine (at 650) whether the selection of the one or more nodes as endorsers is within a utilization threshold of each node. In some embodiments, the utilization threshold may be derived from the load distribution configuration, and the tracking of nodes previously selected as endorsers under the current active endorser selection scheme.

In response to determining (at 650—No) that one or more of nodes 120 selected as endorsers have exceeded their utilization threshold (e.g., selected nodes 120 are receiving a disproportionate load as determined from the load distribution configuration and previous endorser selections), process 600 may include rejecting the selection, determining (at 620) whether the exit criteria for the active endorser selection scheme has been met, randomly selecting (at 640) a different node as an endorser with the current active endorser selection scheme when determining (at 620—Yes) that the exit criteria is not met, or randomly selecting (640) a different node as an endorser with a randomly selected (at 630) different endorser selection scheme when determining (at 620—No) that the exit criteria for the current active endorser selection scheme is met.

In response to determining (at 650—Yes) that one or more of nodes 120 selected as endorsers have not exceeded their utilization threshold, process 600 may include providing (at 660) an endorsement request to each node 120 that is selected as an endorser, and updating (at 670) node utilization for the current active endorser selection scheme. Updating the node utilization may include incrementing, within datastore 415, a count for each node 120 that is selected as an endorser under the current active endorser selection scheme.

In some embodiments, the endorsement request may include a one-time validation key, a top hash, and a hash tree with leaves corresponding to the hash values of the individual data instances that are subject to endorsement and recordation to blockchain 130 after endorsement. The top hash may be derived from hashing a last or previous hash value of blockchain 130 and a root hash value of the hash tree. The previous hash value of blockchain 130 may correspond to a hash value of a last or previous block that was committed to blockchain 130. The previous hash value may be obtained from the global ledger of blockchain 130 or a local ledger of blockchain 130 stored by data provenance system 410. Data provenance system 410 may compute the root hash value by hashing upwards from the hash values of different pairs of hash tree leaves, and continuing the hashing up the branches of the hash tree until a hash value for the hash tree root is computed.

The one-time validation key may be provided for security purposes, and may be used to verify that endorsement confirmation comes from a node that was selected, by selector 110 of data provenance system 410, as an endorser for the corresponding data. For instance, a node that provides endorsement confirmation for the received (at 610) data without the one-time validation key included as part of the endorsement request will be ignored or rejected as coming from a node that was not selected as an endorser for that data.

The one or more selected endorsers endorse the one or more data instances included as part of the endorsement request by recomputing and matching the top hash that was provided with the endorsement request. Each endorser may obtain a previous hash value of blockchain 130 from a local ledger stored by the endorser. Each endorser may then compute the root hash for the hash tree provided with the endorsement request. In a similar manner as noted above, each endorser may hash upwards from the hash values of different pairs of the hash tree leaves, until hashing the hash value for the hash tree root. Each endorser may compute a local top hash by hashing the previous hash value of blockchain 130 with the computed hash value of the hash tree root. An endorser may provide an endorsement confirmation in response to matching the recomputed top hash with the top hash provided in the endorsement request. An error occurs and the one or more data instances associated with the endorsement request cannot be validated and recorded to blockchain 130 when the recomputed top hash value does not match the top hash from the endorsement request. In this case, errors may be returned to data provenance system 410 and/or nodes 120 that originated the data for recordation to blockchain 130.

Each endorsement confirmation may be returned to the endorsement request originator. For instance, each endorsement confirmation may be received by data provenance system 410, or selector 110 of data provenance system 410. In response to receiving endorsement confirmation for one or more data instances from all or a threshold number of endorsers, data provenance system 410 may generate a new block for blockchain 130, and may broadcast the block to each node 120 that participates in the blockchain network. In response to the broadcast block, each node 120 may update their local ledger or distributed copy of blockchain 130. Data provenance system 410 may also commit the block to the global ledger. The block may contain at least the top hash and the previous hash to a prior block, thereby forming a linked list with other blocks in blockchain 130.

Figure 7:
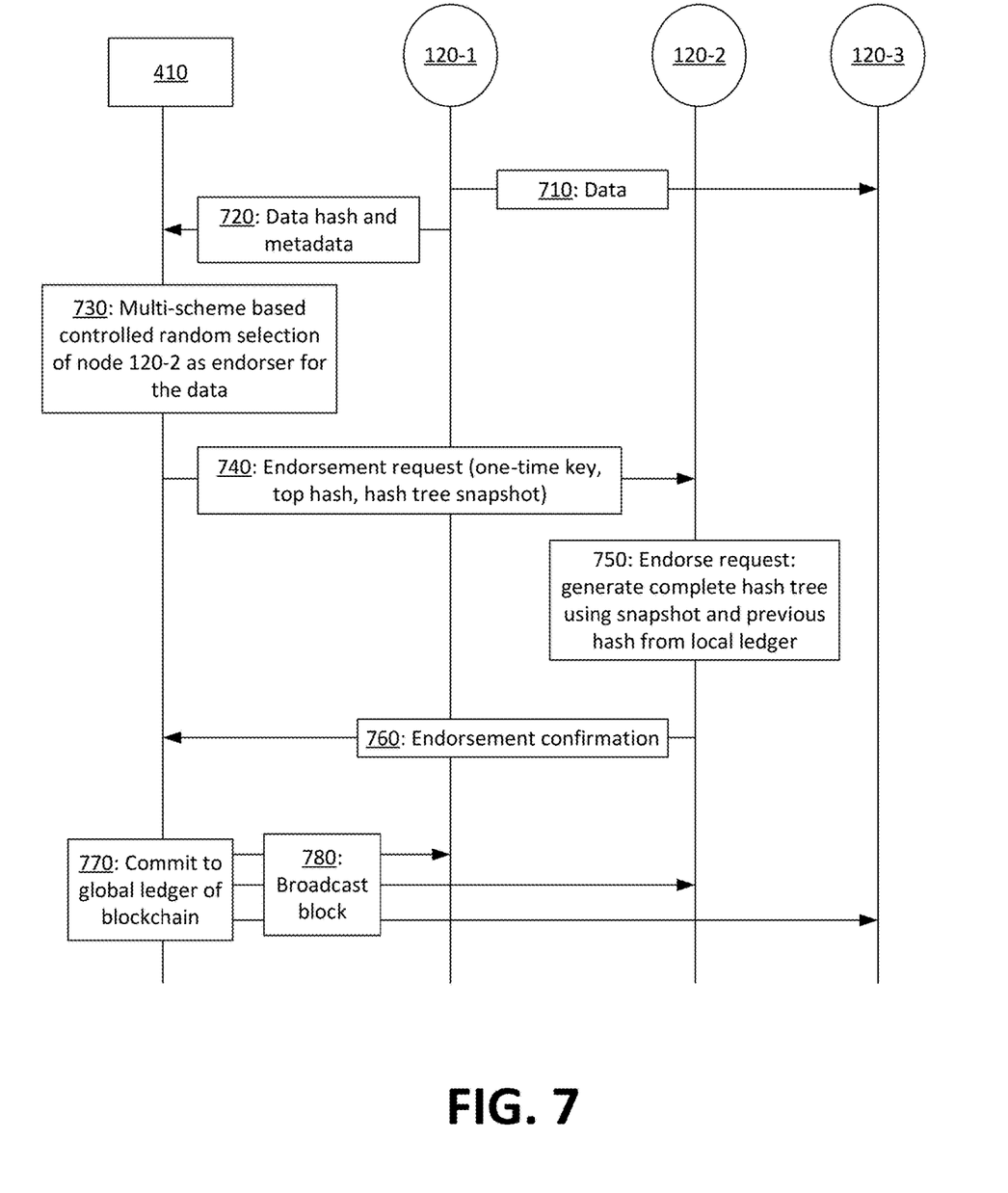
FIG. 7 illustrates an example of a data provenance system facilitating data endorsement and recordation in accordance with some embodiments.

FIG. 7 illustrates an example of data provenance system 410 facilitating data endorsement and recordation in accordance with some embodiments. FIG. 7 illustrates a blockchain network that may include data provenance system 410 and participating nodes 120. Although nodes 120-1, 120-2, and 120-3 are shown to be participating in the blockchain network of FIG. 7, additional nodes 120 that are not implicated by this particular endorsement and recordation example may also operate as part of the blockchain network.

Node 120-1 may provide (at 710) data to node 120-3, and may provide (at 720) a request to data provenance system 410 to record the data in a blockchain of the blockchain network. The request may include a hash value derived from the data, and metadata identifying the data. The hash value may be computed by node 120-1, and provided in place of the actual data for security purposes. Data provenance system 410 may update the load distribution configuration or tracked actual usage of the blockchain network by node 120-1 in response to node 120-1 originating the recordation request.

Data provenance system 410 may use (at 730) the multi-scheme random selection of blockchain endorsers to select node 120-2 as an endorser. Here again, the selection of node 120-2 as an endorser may be based on a random selection of an endorser selection scheme from a set of available endorser selection schemes, and then a random selection of node 120-2 from the participating nodes 120 as an endorser using the selected endorser selection scheme.

Data provenance system 410 may provide (at 740) an endorsement request to node 120-2 based on the selection (at 730) of node 120-2 as an endorser. The endorsement request may include a one-time key, a top hash, and a hash tree (e.g., Merkle tree) snapshot. The hash tree may include the hash value of the data as one leaf.

Node 120-2 may endorse (at 750) the data in response to receiving the endorsement request. To do so, node 120-2 may generate a complete hash tree using the snapshot of the hash tree provided with the endorsement request. In particular, node 120-2 may hash upwards from the hash tree leaves until deriving the hash tree root. Node 120-2 may then hash the hash tree root with a previous hash from a local ledger in order to produce a local top hash.

Node 120-2 may provide (at 760) endorsement confirmation to data provenance system 410 in response to the locally generated top hash value matching the top hash from the endorsement request. In response to receiving endorsement confirmation from all selected endorsers or a threshold number of endorsers, data provenance system 410 may commit (at 770) a block recording the data and/or other data to the global ledger of the blockchain, and/or broadcasting (at 780) the block to each node 120 participating in the blockchain network for entry into their respective local ledgers of the blockchain.

Figure 8:
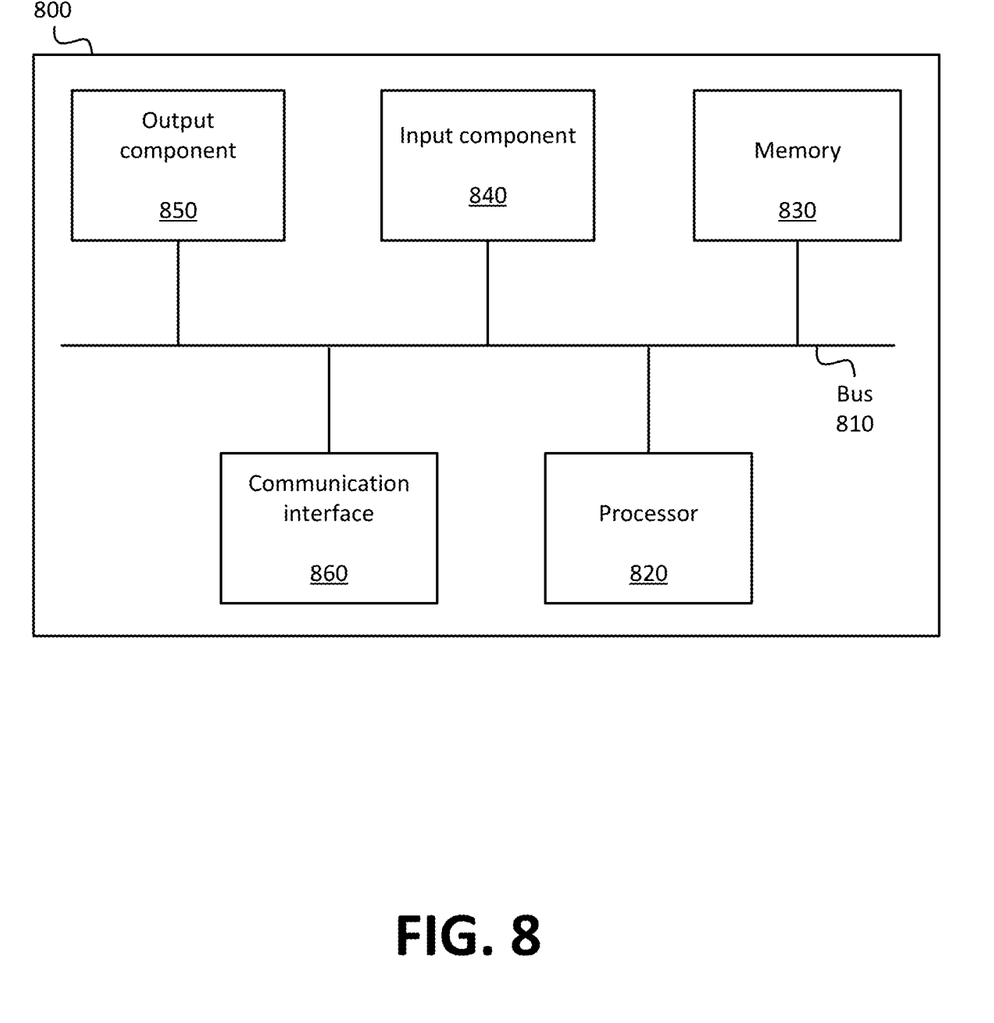
FIG. 8 illustrates example components of one or more devices, according to one or more embodiments described herein.

FIG. 8 is a diagram of example components of device 800. Device 800 may be used to implement one or more of the devices or systems described above (e.g., selector 110, data provenance system 410, and nodes 120). Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of blocks and/or signals have been described with regard to FIGS. 1, 2, 6, and 7, the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms) Similarly, the term "less than" (or similar terms), as used herein to describe a relationship of a value to a threshold, may be used interchangeably with the term "less than or equal to" Or similar terms). As used herein, "exceeding" a threshold (or similar terms) may be used interchangeably with "being greater than a threshold," "being greater than or equal to a threshold," "being less than a threshold," "being less than or equal to a threshold." or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device comprising:
one or more hardware processors configured to:
receive a first request to record first data to a blockchain network comprising a plurality of nodes;
use a first randomization scheme to randomly select a first node of the plurality of nodes;
record the first data to the blockchain network based on an endorsement of the first data by the first node;
receive a second request to record second data to the blockchain network:
use a second randomization scheme, that is different from the first randomization scheme, to randomly select a second node of the plurality of nodes; and
record the second data to the blockchain network based on an endorsement of the second data by the second node.

2. The device of claim 1, wherein the one or more processors are further configured to:
select the second randomization scheme from a plurality of available randomization schemes, wherein the plurality of available randomization schemes include the first and second randomization schemes.

3. The device of claim 2, wherein the one or more processors are further configured to:
identify one or more exit criteria associated with the first randomization scheme; and
determine that the one or more exit criteria have been met, wherein selecting the second randomization scheme from the plurality of available randomization schemes is performed based on the determination that the one or more exit criteria have been met.

4. The device of claim 3, wherein the one or more processors are further configured to:
determine that a likelihood of selection of a particular node, of the plurality of nodes, based on the first randomization scheme exceeds a threshold likelihood of selection,
wherein identifying the one or more exit criteria associated with the first randomization scheme have been met is based on the determination that the likelihood of selection of the particular node, of the plurality of nodes, based on the first randomization scheme exceeds the threshold likelihood of selection.

5. The device of claim 1, wherein the first randomization scheme includes a first set of randomization policies used to generate random values, and wherein the second randomization scheme includes a second set of randomization policies used to generate random values, wherein the first and second sets of randomization policies are different sets of randomization policies.

6. The device of claim 5, wherein the first and second sets of randomization policies are based on load distributions of the plurality of nodes of the blockchain network.

7. The device of claim 6, wherein the load distribution, for a particular node of the plurality of nodes, is based on at least one of:
a quantity of data recordation requests issued by the particular node over a particular period of time, or
a quantity of endorsements of data, to be recorded to the blockchain network, performed by the particular node over the particular period of time.

8. A non-transitory computer-readable medium, storing a set of processor-executable instructions to:
receive a first request to record first data to a blockchain network comprising a plurality of nodes;
use a first randomization scheme to randomly select a first node of the plurality of nodes;
record the first data to the blockchain network based on an endorsement of the first data by the first node;
receive a second request to record second data to the blockchain network;

use a second randomization scheme, that is different from the first randomization scheme, to randomly select a second node of the plurality of nodes; and record the second data to the blockchain network based on an endorsement of the second data by the second node.

9. The non-transitory computer-readable medium of claim 8, wherein the plurality of processor-executable instructions further include processor-executable instructions to:

select the second randomization scheme from a plurality of available randomization schemes, wherein the plurality of available randomization schemes include the first and second randomization schemes.

10. The non-transitory computer-readable medium of claim 9, wherein the plurality of processor-executable instructions further include processor-executable instructions to:

identify one or more exit criteria associated with the first randomization scheme; and determine that the one or more exit criteria have been met, wherein selecting the second randomization scheme from the plurality of available randomization schemes is performed based on the determination that the one or more exit criteria have been met.

11. The non-transitory computer-readable medium of claim 10, wherein the plurality of processor-executable instructions further include processor-executable instructions to:

determine that a likelihood of selection of a particular node, of the plurality of nodes, based on the first randomization scheme exceeds a threshold likelihood of selection, wherein identifying the one or more exit criteria associated with the first randomization scheme have been met is based on the determination that the likelihood of selection of the particular node, of the plurality of nodes, based on the first randomization scheme exceeds the threshold likelihood of selection.

12. The non-transitory computer-readable medium of claim 8, wherein the first randomization scheme includes a first set of randomization policies used to generate random values, and wherein the second randomization scheme includes a second set of randomization policies used to generate random values, wherein the first and second sets of randomization policies are different sets of randomization policies.

13. The non-transitory computer-readable medium of claim 12, wherein the first and second sets of randomization policies are based on load distributions of the plurality of nodes of the blockchain network.

14. The non-transitory computer-readable medium of claim 13, wherein the load distribution, for a particular node of the plurality of nodes, is based on at least one of:

a quantity of data recordation requests issued by the particular node over a particular period of time, or a quantity of endorsements of data, to be recorded to the blockchain network, performed by the particular node over the particular period of time.

15. A method, comprising:

receiving a first request to record first data to a blockchain network comprising a plurality of nodes;

using a first randomization scheme to randomly select a first node of the plurality of nodes;

recording the first data to the blockchain network based on an endorsement of the first data by the first node;

receiving a second request to record second data to the blockchain network:

using a second randomization scheme, that is different from the first randomization scheme, to randomly select a second node of the plurality of nodes; and recording the second data to the blockchain network based on an endorsement of the second data by the second node.

16. The method of claim 15, further comprising:

selecting the second randomization scheme from a plurality of available randomization schemes, wherein the plurality of available randomization schemes include the first and second randomization schemes;

identifying one or more exit criteria associated with the first randomization scheme; and determining that the one or more exit criteria have been met, wherein selecting the second randomization scheme from the plurality of available randomization schemes is performed based on the determination that the one or more exit criteria have been met.

17. The method of claim 16, further comprising:

determining that a likelihood of selection of a particular node, of the plurality of nodes, based on the first randomization scheme exceeds a threshold likelihood of selection, wherein identifying the one or more exit criteria associated with the first randomization scheme have been met is based on the determination that the likelihood of selection of the particular node, of the plurality of nodes, based on the first randomization scheme exceeds the threshold likelihood of selection.

18. The method of claim 15, wherein the first randomization scheme includes a first set of randomization policies used to generate random values, and wherein the second randomization scheme includes a second set of randomization policies used to generate random values, wherein the first and second sets of randomization policies are different sets of randomization policies.

19. The method of claim 18, wherein the first and second sets of randomization policies are based on load distributions of the plurality of nodes of the blockchain network.

20. The method of claim 19, wherein the load distribution, for a particular node of the plurality of nodes, is based on at least one of:

a quantity of data recordation requests issued by the particular node over a particular period of time, or a quantity of endorsements of data, to be recorded to the blockchain network, performed by the particular node over the particular period of time.

\* \* \* \* \*